(12) United States Patent
Damgaard et al.

(10) Patent No.: US 8,459,936 B2
(45) Date of Patent: Jun. 11, 2013

(54) FLEXIBLE SEAL FOR GAS TURBINE ENGINE SYSTEM

(75) Inventors: Jocelyn Charis Damgaard, Vernon, CT (US); Steven D. Roberts, Moodus, CT (US); Timothy Dale, Manchester, CT (US); Richard W. Monahan, Farmington, CT (US); David C. Pimenta, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 25 days.

(21) Appl. No.: 13/173,522

(22) Filed: Jun. 30, 2011

(65) Prior Publication Data

US 2012/0131928 A1    May 31, 2012

Related U.S. Application Data

(63) Continuation-in-part of application No. 11/947,814, filed on Nov. 30, 2007.

(51) Int. Cl.
*F16L 51/03* (2006.01)
*F16L 27/111* (2006.01)
*F16L 27/12* (2006.01)
*F02C 7/20* (2006.01)

(52) U.S. Cl.
USPC ..... 415/128; 415/135; 415/213.1; 415/214.1; 285/226; 285/301

(58) Field of Classification Search
USPC ........... 415/126–128, 134, 135, 213.1, 214.1; 60/39.5, 232, 770, 771; 285/226, 227, 229, 285/299, 301; 239/265.19, 254.33, 265.35
See application file for complete search history.

(56) References Cited

U.S. PATENT DOCUMENTS

| 2,886,885 | A | * | 5/1959 | Reid, Jr. ................ 29/421.1 |
| 3,090,198 | A | * | 5/1963 | Zeisloft .............. 239/265.35 |
| 3,263,704 | A | * | 8/1966 | Boisjoly ................... 138/42 |
| 3,315,704 | A | * | 4/1967 | Shire ...................... 138/121 |
| 3,663,044 | A | * | 5/1972 | Contreras et al. ......... 285/226 |
| 3,972,475 | A | | 8/1976 | Nelson et al. |
| 4,009,509 | A | | 3/1977 | McCormick |
| 4,044,971 | A | * | 8/1977 | Pharris ..................... 244/7 R |
| 4,772,033 | A | * | 9/1988 | Nash ........................ 285/263 |
| 5,031,836 | A | | 7/1991 | Ward |
| 5,215,257 | A | | 6/1993 | Barcza |
| 5,284,347 | A | | 2/1994 | Pope |
| 5,368,281 | A | | 11/1994 | Skyba |

(Continued)

FOREIGN PATENT DOCUMENTS

| EP | 0697514 A1 | 2/1996 |
| JP | 2004019644 A | 1/2004 |
| JP | 2006064286 A | 3/2006 |

*Primary Examiner* — Edward Look
*Assistant Examiner* — Jesse Prager
(74) *Attorney, Agent, or Firm* — Kinney & Lange, P.A.

(57) ABSTRACT

A system includes a gas turbine engine, a nozzle structure located adjacent to the gas turbine engine, a flexible annular seal linking the gas turbine engine and the nozzle structure, the flexible annular seal having a plurality of corrugate sections arranged about a centerline, and a connection device secured to the gas turbine engine and to the nozzle structure. The connection device is adjustable to select a length of the flexible annular seal measured along the centerline.

15 Claims, 6 Drawing Sheets

U.S. PATENT DOCUMENTS

| | | |
|---|---|---|
| 5,370,312 A | 12/1994 | Kight |
| 5,412,939 A | 5/1995 | Hover et al. |
| 5,433,070 A | 7/1995 | Amelio |
| 5,522,546 A | 6/1996 | Jarvis |
| 5,584,511 A | 12/1996 | Gonzalez et al. |
| 5,630,593 A | 5/1997 | Swensen et al. |
| 5,722,640 A | 3/1998 | Skyba |
| 5,794,851 A | 8/1998 | Barcza |
| 6,237,921 B1 | 5/2001 | Liotta et al. |
| 6,267,327 B1 | 7/2001 | Siefker |
| 6,347,510 B1 | 2/2002 | McAlice et al. |
| 6,450,762 B1 * | 9/2002 | Munshi .......................... 415/138 |
| 6,702,300 B1 | 3/2004 | Steinetz et al. |
| 7,017,913 B2 | 3/2006 | Klenk et al. |
| 7,128,323 B2 | 10/2006 | Iguchi et al. |
| 7,172,388 B2 | 2/2007 | Synnott |
| 7,216,476 B2 * | 5/2007 | Fink ................................ 60/232 |
| 7,699,320 B2 | 4/2010 | Iguchi et al. |
| 7,909,369 B2 | 3/2011 | Kertesz et al. |
| 2009/0140497 A1 | 6/2009 | Roberts et al. |
| 2009/0230676 A1 * | 9/2009 | Rohwedder .................. 285/301 |

\* cited by examiner

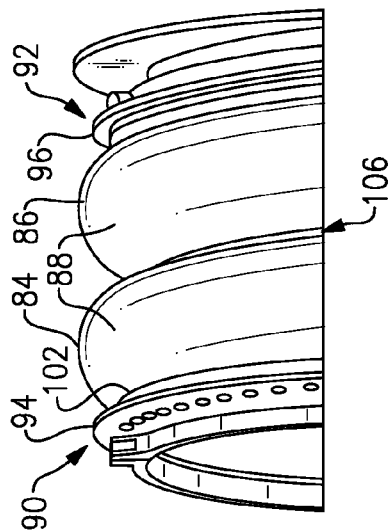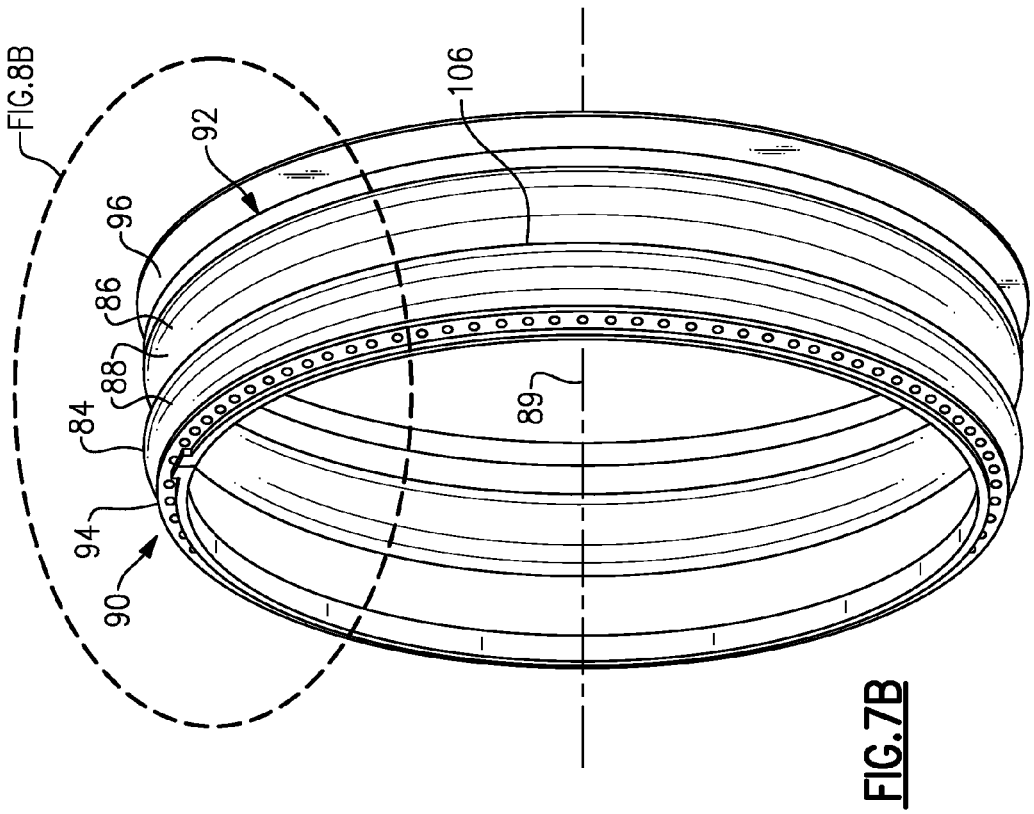

FLEXIBLE SEAL FOR GAS TURBINE ENGINE SYSTEM

CROSS-REFERENCE TO RELATED APPLICATION(S)

This application is a continuation-in-part of U.S. application Ser. No. 11/947,814, filed Nov. 30, 2007, which is hereby incorporated by reference in its entirety.

STATEMENT OF GOVERNMENT INTEREST

This invention was made with government support under Contract No. Northrop Grumman: PO 2669849 awarded by The United States Navy. The government has certain rights in the invention.

This invention was made with government support under Contract No. 2594747 awarded by the United States Navy. The government therefore has certain rights in this invention.

BACKGROUND OF THE INVENTION

This disclosure relates to the use of a flexible seal as a solution to eliminating an over constrained mounted system when specific entities of the system must be linked to one another in a particular manner that breaks the equilibrium each individual entity contained on its own. A particular example of this application is with a gas turbine engine.

Gas turbine engines are commonly known and used to propel aircraft. One or more gas turbine engines may be rigidly secured to an airframe of the aircraft.

Various aircraft conditions may result in large deflections and/or load transfers within the gas turbine engine system as well as between the engine and airframe. If the system is not in equilibrium, there is a possibility for undesirable load to be transferred between engine components, and between the engine and mounting system. These loads may induce undesirable stresses on the engine.

SUMMARY OF THE INVENTION

A system according to an embodiment of the present invention includes a gas turbine engine, a nozzle structure located adjacent to the gas turbine engine, a flexible annular seal linking the gas turbine engine and the nozzle structure, the flexible annular seal having a plurality of corrugate sections arranged about a centerline, and a connection device secured to the gas turbine engine and to the nozzle structure. The connection device is adjustable to select a length of the flexible annular seal measured along the centerline.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 7B illustrates a perspective view of the flexible seal of FIG. 7A.

FIG. 8B illustrates a perspective view of a portion of the flexible seal of FIG. 7B.

DETAILED DESCRIPTION OF THE PREFERRED EMBODIMENT

Figure 1:
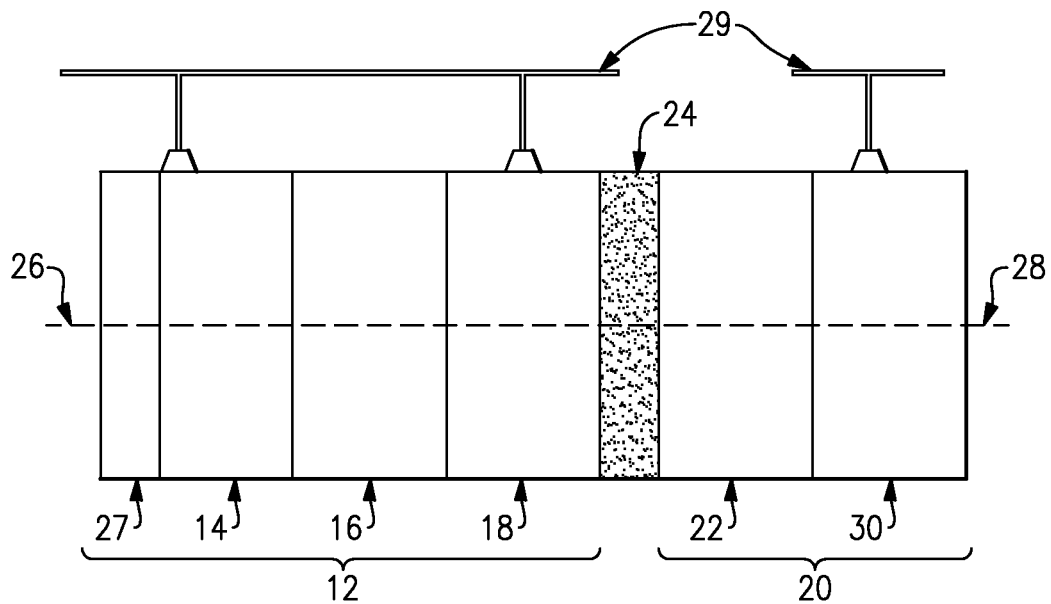
FIG. 1 schematically illustrates an example gas turbine engine system having a flexible seal between a gas turbine engine and an exhaust nozzle.

FIG. 1 schematically illustrates a flexible seal 24 linking together a gas turbine engine 12 with an exhaust nozzle system 20. The gas turbine engine 12 generally includes a compression section 14, a combustion section 16, and a turbine section 18 that cooperate in a known manner to provide propulsion. Other engine sections, such as a fan section 27, may be included depending on the type of engine. The nozzle exhaust system 20 includes a nozzle duct 22 and, optionally, an afterburner system 30 (i.e. augmentor). An airframe 29 mounts to the gas turbine engine 12 near the compression section 14 and the turbine section 18. The airframe 29 also mounts to the nozzle exhaust system 20 between the afterburner system 30 and the nozzle duct 22.

As separate entities mounted to the airframe 29, the gas turbine engine 12 and the nozzle exhaust system 20 have deterministic load paths to the airframe 29. In contrast, when the gas turbine engine 12 and nozzle exhaust system 20 are hard linked together, the system no longer acts deterministically. The gas turbine engine 12 and airframe 29 act as an integral system. As such, the gas turbine engine 12 is a load bearing member supporting the airframe 29 and vise versa. These types of systems can transfer undesirable loads between one another. For example, a high impact landing can cause significant airframe 29 deflections, creating a high bending load in the gas turbine engine 12.

The gas turbine engine 12 and the nozzle exhaust system 20 must be coupled for the gas turbine engine 12 to operate properly within the aircraft. However, the gas turbine engine 12 and nozzle exhaust system 20 must remain in equilibrium with the airframe 29 in order to handle loads properly.

In the illustrated example, the axis 26 and axis 28 are generally parallel and coaxial, such as when there is no deflection between the gas turbine engine 12 and the nozzle exhaust system 20. However, under certain conditions, the nozzle exhaust system 20 may deflect relative to the gas turbine engine 12. In this regard, a flexible seal 24 located between the nozzle exhaust system 20 and the gas turbine engine 12 deflects to thereby minimize the load being transferred between the gas turbine engine 12 and the nozzle exhaust system 20 and allow system equilibrium to be maintained.

For example, the nozzle exhaust system 20 may deflect relative to the gas turbine engine 12 in response to the aircraft taking off, landing, an air maneuver, a bolter maneuver relative to an aircraft carrier, or thermally induced loads. That is, the flexible seal 24 may accommodate relatively large axial and transverse displacements between two rigid structures without significant load transfer.

Figure 2:
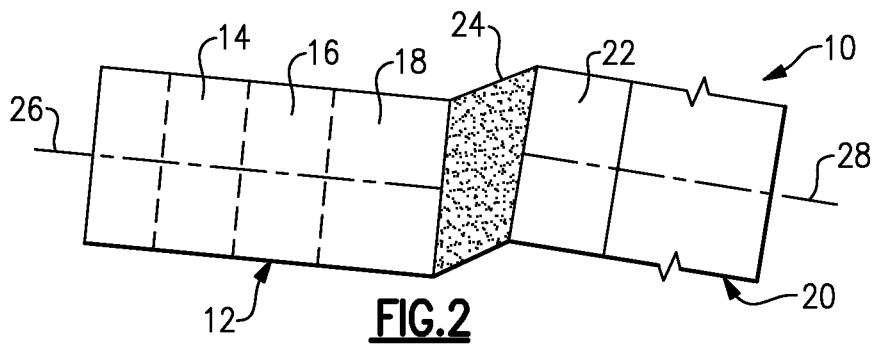
FIG. 2 schematically illustrates a possible deflection condition between the gas turbine engine and the exhaust nozzle.

FIG. 2 illustrates one example of a deflected state between the gas turbine engine 12 and the nozzle exhaust system 20. In this example, the deflection is such that the axes 26 and 28 become non-coaxial but remain generally parallel. Thus, the nozzle exhaust system 20 shifts relative to the engine 12. In this regard, the flexible seal 24 deflects and absorbs the loads from both the engine 12 and the nozzle 20. A rigid connection between the engine 12 and the nozzle exhaust system 20 would result in large transverse loads under this condition. As a result large stresses could form and put the parts in jeopardy of not meeting their necessary requirements.

Figure 3:
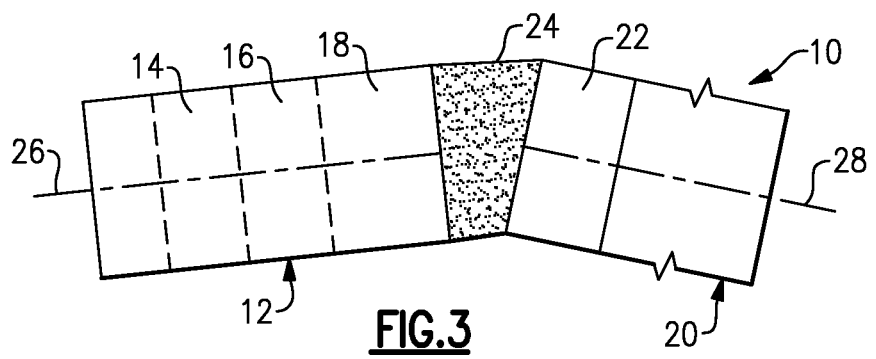
FIG. 3 schematically illustrates another possible deflection condition between the gas turbine engine and the exhaust nozzle.

FIG. 3 illustrates another example of a deflected state between the engine 12 and the nozzle exhaust system 20. In this example, the nozzle exhaust system 20 deflects relative to the engine 12 such that the axes 26 and 28 become non-parallel and non-coaxial. Similar to the example of FIG. 2, the flexible seal 24 deflects and gives the two parts the freedom to move without inducing large loads in each part.

Thus, as illustrated in the above examples, the flexible seal 24 is operable under a variety of different deflection conditions. As can be appreciated, the flexible seal 24 may also maintain load equilibrium under a variety of other deflection states than shown in these examples.

Figure 4:
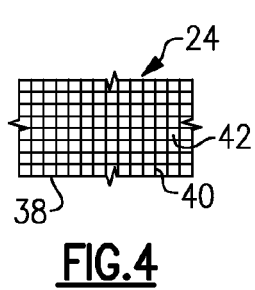
FIG. 4 illustrates an example lay-up of the elastomer composite of the flexible seal.

FIG. 4 illustrates a portion of the flexible seal 24. In this example, the flexible seal 24 includes an elastomer composite 38. The elastomer composite 38 includes reinforcement fibers 40 that are disposed within an elastomer matrix 42. Optionally, the flexible seal 24 may include only the elastomer, without the addition of reinforcement fillers.

The reinforcement fibers 40 may be selected from any suitable type of material for providing strength and flexibility of the flexible seal 24. In one example, the reinforcement fillers 40 are glass fibers and may be continuous, discontinuous, woven, non-woven, or provided in any suitable type of arrangement. For example, the glass fibers are somewhat flexible, but are strong in an axial fiber direction to provide the flexible seal 24 with strength while maintaining a desired degree of flexibility.

The elastomer matrix 42 may also be selected from any suitable type of material for providing flexibility and other desired properties of the flexible seal 24. For example, the elastomer matrix 42 may include any suitable type of elastomer material, such as silicone, which may also resist the temperatures associated with the exhaust gases.

The elastomer composite 38 may be formed into a desired shape of the flexible seal 24 using any suitable forming process. In one example, the elastomer composite 38 is formed using a molding process. One example molding process includes laying-up a desired number of plies of the reinforcement fibers 40, infiltrating the reinforcement fibers 40 with the elastomer matrix 42, and curing the elastomer matrix 42. Autoclave and flexible bagging techniques may also be employed. Given this description, one of ordinary skill in the art will recognize other type of molding or forming processes to meet their particular needs.

Figure 5:
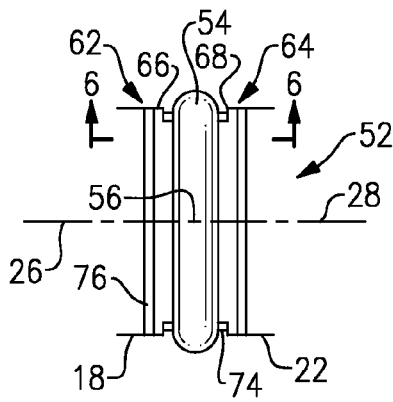
FIG. 5 illustrates an example of a single prominence elastomer composite flexible seal.
Figure 6:
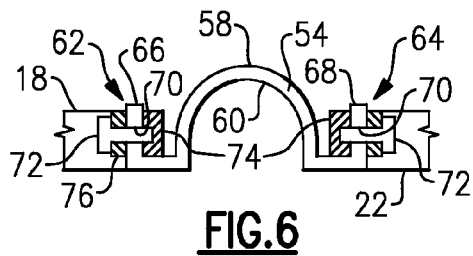
FIG. 6 illustrates a cross-section of the flexible seal of FIG. 5 and how it is linked to adjacent parts.

FIG. 5 illustrates an example flexible seal 52 that may be used as the flexible seal 24. Referring also to FIG. 6, the flexible seal 52 includes a flexible annular wall 54 that extends around a central axis 56. The flexible annular wall 54 includes a convex outer surface 58 and a concave inner surface 60 relative to the axis 56.

The flexible annular wall 54 extends between a first end 62 that is attachable to the discharge duct 18 and a second end 64 that is attachable to the nozzle duct 22 of the nozzle exhaust system 20. In this example, the first end 62 and the second end 64 include respective flanges 66 and 68. Each of the flanges 66 and 68 include openings 70 for receiving fasteners 72 to secure the flexible seal 52 within the gas turbine engine system 10. Alternatively, other desired shapes of the ends 62 and 64 may be provided for attaching the flexible seal 52.

Optionally, a reinforcement ring 74 may be used on a back side of either of the flanges 66 and 68 to secure the fasteners 72 and to provide stiffness to the flanges 66 and 68.

In the illustrated example, the fasteners 72 secure a clamp member 76, such as a Marman clamp, to the respective flanges 66 and 68. The clamp members 76 secure the gas turbine engine 12 and the nozzle exhaust system 20 with the flexible seal 52. Once secured, the flexible annular wall 54 may deflect in response to relative deflection between the nozzle exhaust system 20 and the gas turbine engine 12 as described above. As can be appreciated, other suitable type of clamps or attachment techniques may be used to secure the gas turbine engine 12 and the nozzle exhaust system 20 with the flexible seal 52.

Figure 7A:
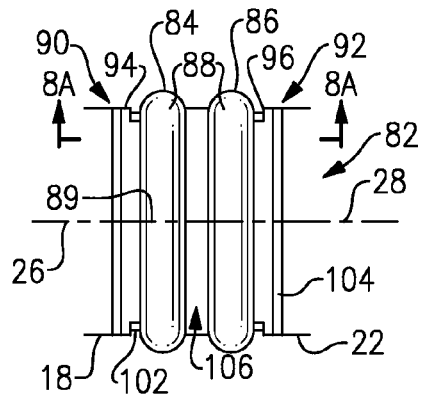
FIG. 7A illustrates an example of a double prominence elastomer composite flexible seal.
Figure 8A:
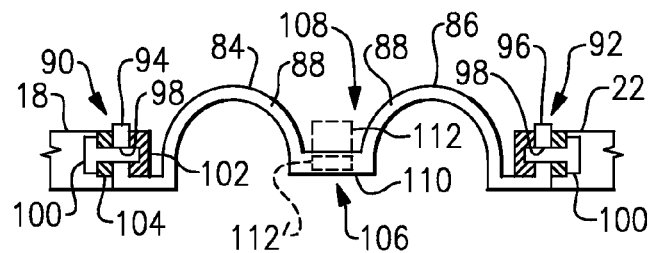
FIG. 8A illustrates a cross-section of the flexible seal of FIG. 7A.

FIGS. 7A and 7B illustrate another example of a flexible seal 82 that may be used as the flexible seal 24 described above. In this example, the flexible seal 82 includes two corrugate sections 84 and 86 that are each somewhat similar to the flexible seal 52 of the previous example. Referring also to FIGS. 8A and 8B, each of the corrugate sections 84 and 86 includes a flexible annular wall 88 that extends about a central axis 89 between a first end 90 for attachment to the gas turbine engine 12 and a second end 92 for attachment to the nozzle exhaust system 20. Similar to the previous example, the first end 90 and the second end 92 include respective flanges 94 and 96 having openings 98 for receiving fasteners 100 to secure a reinforcement ring 102 with a clamp 104.

In this example, the flexible annular wall 88 is continuous such that the flexible seal 82 forms a single, monolithic piece. That is, the flexible annular wall 88 extends continuously, without a mechanical joint, between the first end 90 and the second end 92 and completely around the axis 89. The continuity may facilitate resistance of the flexible annular wall 88 to fatigue or other durability related factors.

The flexible seal 82 includes a central section 106 between the first corrugate section 84 and the second corrugate section 86. The central section 106 forms a valley 108 and a peak 110 between the corrugate sections 84 and 86. The central section 106 is flexible, similar to the corrugate sections 84 and 86. In some examples, a lower degree of flexibility of the central section 106 may be desired to resist ballooning of the central section 106 outwards, such as from gas pressure within the flexible seal 82. In this regard, a reinforcement member 112, such as a strap, may be provided within the valley 108 to stiffen the central section 106. Alternatively, a reinforcement member 112', such as plies of reinforcement material, may be integrally formed into the flexible annular walls 88 to stiffen the central section 106. For example, the reinforcement member 112' may be molded directly into the flexible annular walls 88 during a processing step, such as laying-up the reinforcement member 112' during molding.

Figure 9:
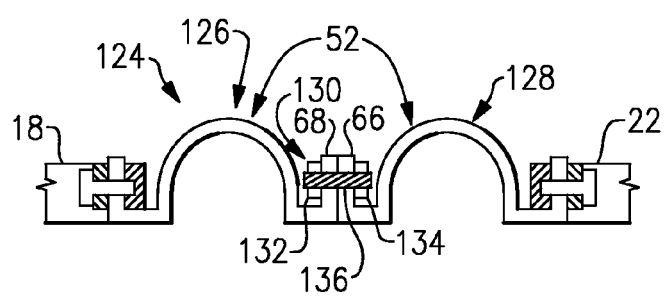
FIG. 9 illustrates another example of a flexible seal having a plurality of corrugate sections.

As illustrated in FIG. 9, two of the flexible seals 52 from the example of FIGS. 5 and 6 may be secured together to form a flexible seal 124 that may be used as the flexible seal 24. In this regard, each of the flexible seals 52 forms a respective corrugate section 126 and 128 that are mechanically attached together using a clamp 130. The clamp 130 is also annular and coextends circumferentially with the flanges 66 and 68. For example, the flange 66 of one of the flexible seals 52 is sealed against the flange 68 of the other flexible seal 52, and the clamp members 132 and 134 secure the flanges 66 and 68 via fasteners 136.

The above example flexible seals 52, 82, and 124 not only provide a sealed connection between the gas turbine engine 12 and the nozzle exhaust system 20, but they also provide a relatively low spring rate that permits deflection between the nozzle exhaust system 20 and the gas turbine engine 12 without significant transfer of load. Depending upon an amount of available space and a desired spring rate in a particular aircraft, a single seal such as the flexible seal 52, a double seal such as the flexible seal 82 or 124, or a flexible seal having more than two corrugate sections may be used to provide a desirable spring rate. For example, a greater number of corrugated sections generally provides a lower spring rate to accommodate the deflections of the adjacent parts.

Figure 10:
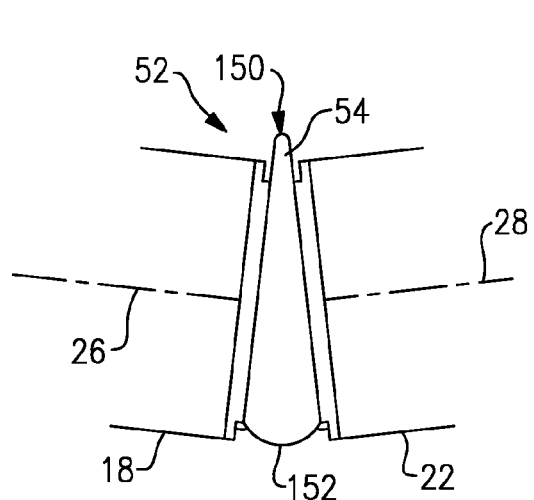
FIG. 10 illustrates an example deflection state of a flexible seal.

In the disclosed examples, the spring rates and the deflections of the flexible seals 52, 82, or 124 depend at least in part on the geometry of the annular seal walls 54 or 88. FIG. 10 illustrates an example deflection state of the flexible seal 52. In this example, portions 150 and 152 of the flexible annular wall 54 bend in response to relative deflection between the gas turbine engine 12 and the nozzle exhaust system 20. The portion 150 contracts under compression of the bending, and portion 152 expands under tension of the bending. The curved shape of the annular seal wall 54 facilitates smooth deflection of the flexible seal 52 to provide a relatively low spring rate without significant transfer of load. As can be appreciated, the flexible seal 52 may also have other deflection states, depending on the deflection state, as illustrated in the example of FIGS. 1-3, for example.

Figure 11:
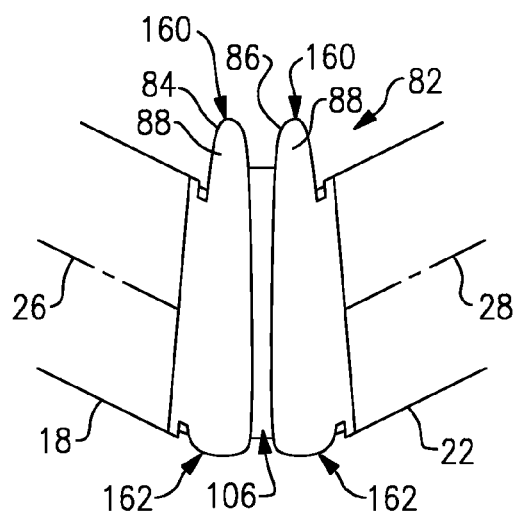
FIG. 11 illustrates an example deflection state of a flexible seal having a plurality of corrugate sections.

FIG. 11 illustrates an example deflection state of the flexible seal 82. As can be appreciated, the deflection of the flexible seal 124 would be similar to the flexible seal 82. In this example, portions 160 and 162 of the flexible annular wall 88 bend in response to relative deflection between the gas turbine engine 12 and the nozzle exhaust system 20. The portions 160 contract under compression of the bending, and portion 162 expands under the tension of the bending. The curved shape of the annular seal wall 88 facilitates smooth deflection of the flexible seal 82 to provide a relatively low spring rate without significant transfer of load.

In this example, using the two corrugate sections 84 and 86 provides a relatively lower spring rate than the flexible seal 52. Likewise, using additional corrugate sections would provide relatively lower spring rates than using the two corrugate sections 84 and 86.

Figure 12:
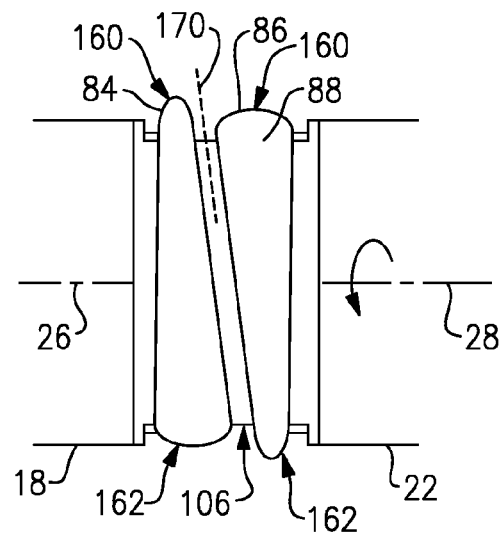
FIG. 12 illustrates another example deflection state of a flexible seal having a plurality of corrugate sections.

FIG. 12 illustrates another example deflection state of the flexible seal 82. In this example, a plane 170 corresponding to the central section 106 pivots relative to the corrugate sections 84 and 86 in response to deflection between the gas turbine engine 12 and the nozzle exhaust system 20 (e.g., torsional deflection or a combination of torsional and bending deflection). The pivoting causes one of the portions 160 and 162 to contract and the other portions 160 and 162 to expand. As can be appreciated, the flexible seal 82 and 124 may also have other deflection states, such as contraction of both portions 160 and 162 or expansion of both portions 160 and 162, for example.

Figure 13:
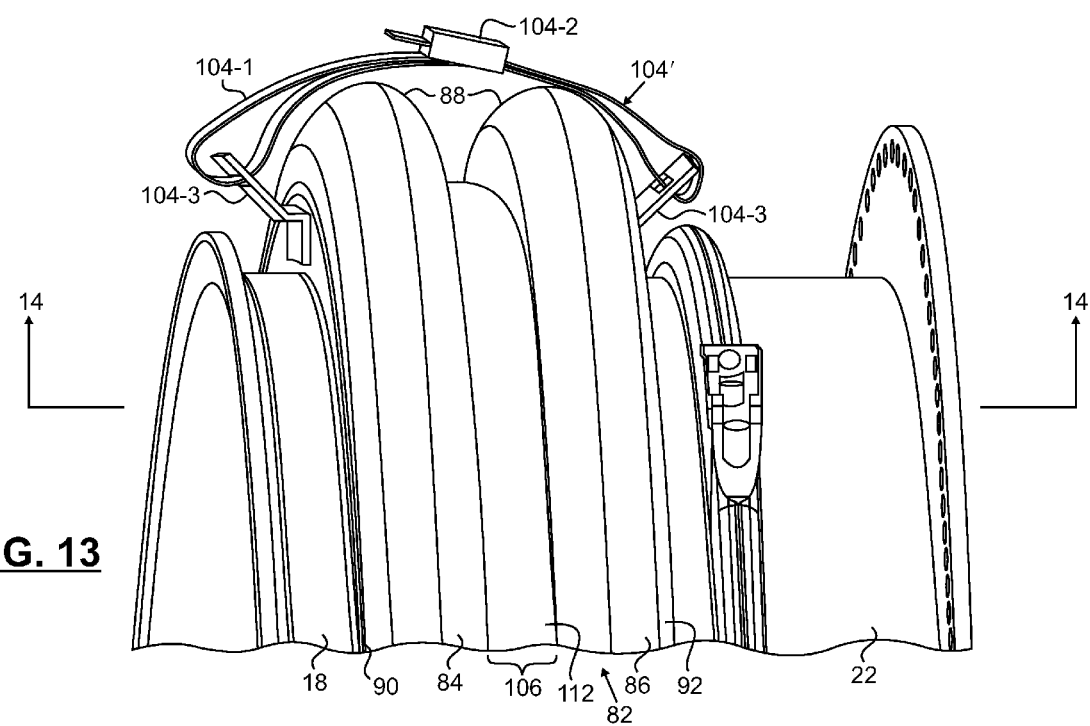
FIG. 13 illustrates another example of a flexible annular seal assembly.
Figure 14:
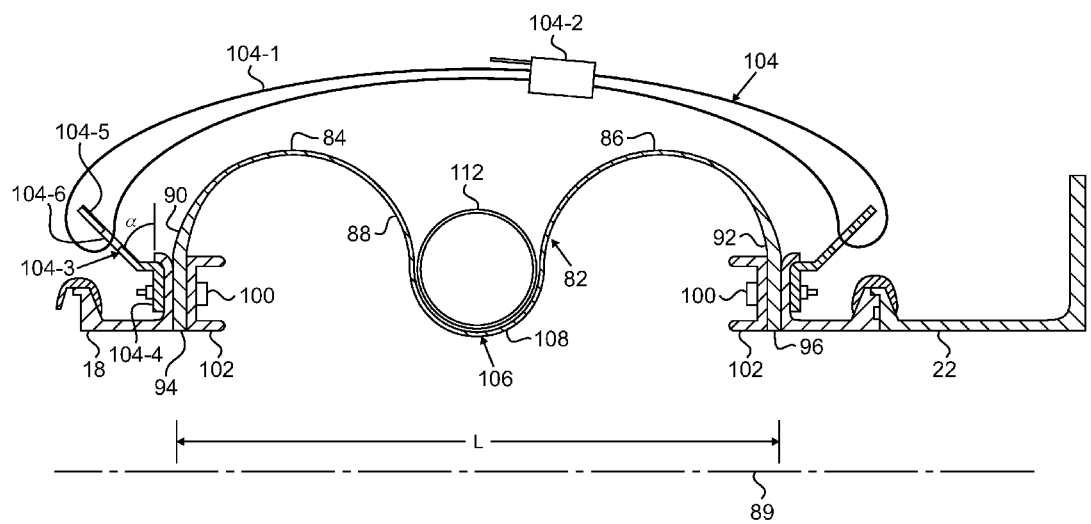
FIG. 14 illustrates a cross-section of the flexible seal assembly of FIG. 13, taken along line 14-14 of FIG. 13.

FIGS. 13 and 14 illustrate another example of the flexible annular seal 82. FIG. 13 is a perspective view of a portion of the flexible annular seal 82 installed between a turbine section 18 of a gas turbine engine component 12 and a nozzle duct 22 of an exhaust nozzle system 20, and FIG. 14 is a cross-sectional view taken along line 14-14 of FIG. 13.

In the example of FIGS. 13 and 14, the flexible seal 82 includes two corrugate sections 84 and 86 that each include a flexible annular wall 88 that extends about the central or centerline axis 89 between the first end 90 for attachment to the gas turbine engine 12 (only a portion of which is shown) and the second end 92 for attachment to the nozzle exhaust system 20 (only a portion of which is shown). The first end 90 and the second end 92 can each include respective flanges 94 and 96 having openings 98 (not clearly visible in FIGS. 13 and 14) for receiving fasteners 100 to secure a corresponding reinforcement ring 102. The reinforcement rings 102 can each have a U-shaped cross-section, and can be positioned at an interior side of the wall 88.

The flexible annular wall 88 can be continuous, that is, a single, monolithic piece, without a mechanical joint, between the first end 90 and the second end 92 and completely around the axis 89. Continuity may facilitate resistance of the flexible annular wall 88 to fatigue or other durability related factors. The flexible annular wall 88 can be made from any suitable materials, such as those discussed above with respect to other examples.

The flexible seal 82 includes a central section 106 between the first corrugate section 84 and the second corrugate section 86. The central section 106 forms a valley 108 between the corrugate sections 84 and 86. The central section 106 is flexible, similar to the corrugate sections 84 and 86. In some applications, a lower degree of flexibility of the central section 106 can be provided to resist ballooning of the central section 106 radially outwards, such as from gas pressure within the flexible seal 82, using a reinforcement member 112. The reinforcement member can be provided within the valley 108 to stiffen the central section 106 of the flexible seal 82. As shown in the example of FIGS. 13 and 14, the reinforcement member is an annular tube with a circular cross-sectional shape, and is positioned at and adjacent to an exterior surface of the flexible annular wall 88. Such a reinforcement member 112 can be fit into position within the valley 108 by temporarily deforming the flexible annular wall 88. Alternatively, the reinforcement member 112 can be a strap or other structure, or can be plies or other materials integrally formed (e.g., molded) into the flexible annular walls 88 to stiffen the central section 106.

One or more connection devices (also called a clamp or compression tool) 104' are provided in the example of FIGS. 13 and 14 to compress the flexible annular seal 82 along the axis 89, in other words, in a direction measured along the axis 89 in a generally axial direction. Each connection device 104' can apply a compressive load to the flexible annular seal 82, and can control a length L of the flexible annular seal 82. Typically at least two connection devices 104' are provided, such as an embodiment with three substantially equally circumferentially spaced connection devices 104', though any number of connections devices 104' can be provided as desired for particular applications. The connection device 104' in the illustrated example is an assembly that includes a strap (or belt) 104-1, an adjustment mechanism 104-2, and two clamp brackets 104-3. In alternative examples, the connection device 104' can use a threaded connection rod or other mechanism other than the strap 104-1. When installed, the connection device 104'1 is positioned along an exterior side of the flexible annular seal 82. The strap 104-1 may contact the exterior surface of the flexible annular wall 88.

The strap 104-1 can be a woven nylon strap or other suitable industrial-strength strap, rope or member. The adjustment mechanism 104-2 can be a ratchet, frictional retention member (like a clothing belt), self-locking buckle, or other suitable member that allows for selectable, and controlled adjustment of the strap 104-1. The clamp brackets 104-3 can each include a first portion 104-4 and a second portion 104-5 that extends from the first portion 104-4. The second portion 104-5 can be arranged at an angle $\alpha$ with respect to the first portion 104-4, where $0°\leq\alpha\leq 90°$ or alternatively where $0°<\alpha<90°$. In one example, the angle $\alpha$ can be approximately 45°. By angling the clamp brackets 104-3, a low radial clearance is provided to allow the flexible annular wall 88 to be fit over one or both clamp brackets 104-3. An opening 104-6 can be provided in the second portion 104-5 to allow engagement of the strap 104-1. Further openings are provided in the clamp brackets 104-3 to allow them to be attached to the turbine section 18 or other component of the gas turbine engine 12 and to the nozzle duct 22 or other component of the exhaust nozzle system 20 using the fasteners 100. Certain of the fasteners 100 used to secure the flexible annular wall 88 can be longer to also accommodate attachment of the clamp brackets 104-3.

During installation, the flexible annular wall 88 is created and shaped to have the corrugated sections 84 and 86. Additional corrugated sections can be provided as desired. The reinforcement member 112 is fit along an exterior of the flexible annular wall 88, typically in the valley 108 between two of the plurality of corrugate sections 84 and 86. The clamp brackets 104-3 are positioned relative to installation locations, and the flexible annular wall 88 is also positioned at the installation location. The fasteners 100 are secured. The connection devices 104' are attached between the respective clamp brackets 104-3. At this point, an operator can manually axially compress the flexible annular seal 82 to the desired length L, and the connection device 104's can then be adjusted to provide a compressive load to maintain the flexible annular seal 82 at the engaged length L during operation. In further examples, adjustment of the connection device 104's can provide adjustment of the length L.

The connection device 104' is relatively lightweight, small in profile and can be easily disassembled after the flexible annular seal 82 is installed, and can be utilized with a relatively low risk of creating damage to other components during installation and use.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. For instance, a seal according to the present invention can be installed in a variety of locations, for a variety of applications. The scope of legal protection given to this disclosure can be determined by studying the following claims.

The invention claimed is:

1. A system comprising:
   a gas turbine engine;
   a nozzle structure located adjacent to the gas turbine engine;
   a flexible annular seal linking the gas turbine engine and the nozzle structure, wherein the flexible annular seal comprises exactly two corrugate sections arranged about a centerline;
   a connection device secured to the gas turbine engine and to the nozzle structure, wherein the connection device is adjustable to select a length of the flexible annular seal measured along the centerline, wherein the connection device comprises:
   a strap; and
   an adjustment mechanism configured to maintain the strap at a selected engaged length;
   a first bracket attached to the gas turbine engine, wherein the connection device is engaged with the first bracket to secure the connection device to the gas turbine engine; and
   a second bracket attached to the nozzle structure, wherein the connection device is engaged with the second bracket to secure the connection device to the nozzle structure, wherein the second bracket comprises:
   a first portion attached to the nozzle structure; and
   a second portion extending from the first portion at an angle greater than zero and less than 90° in a direction away from the flexible annular seal.

2. The system of claim 1, wherein the connection device is configured to compress the flexible annular seal along the centerline.

3. The system of claim 1, wherein the first bracket comprises:
   a first portion attached to the gas turbine engine; and
   a second portion extending from the first portion at an angle greater than zero and less than 90° in a direction away from the flexible annular seal.

4. The system of claim 3, wherein the first bracket further comprises an opening in the second portion usable to engage the connection device.

5. The system of claim 1 and further comprising:
   a reinforcement member positioned between the two corrugate sections.

6. The system of claim 5, wherein the reinforcement member comprises an annular tube positioned adjacent to an outer surface of the flexible annular seal.

7. The system of claim 1, wherein the plurality of corrugate sections are integral and comprise a single monolithic piece.

8. The system of claim 1, wherein the connection device is positioned adjacent to a radially outward surface of the flexible annular seal.

9. A system comprising:
   a gas turbine engine assembly;
   a nozzle;
   a flexible annular wall having a first end that is attachable to the gas turbine engine assembly and a second end that is attachable to the nozzle to define a seal therebetween, wherein the flexible annular wall defines a plurality of corrugate portions;
   a first clamp bracket at the first end of the flexible annular wall attached to the gas turbine engine assembly, wherein the first bracket comprises:
   a first portion attached to the gas turbine engine; and
   a second portion extending from the first portion at an angle greater than zero and less than 90° in a direction away from the flexible annular wall;

a second clamp bracket at the second end of the flexible annular wall attached to the nozzle structure; and a connection device secured to the first clamp bracket and to the second clamp bracket, wherein the connection device is adjustable to select a compressive clamping length measured relative to a centerline defined along a center of the flexible annular wall, and wherein the connection device comprises:

a strap; and an adjustment mechanism configured to maintain the strap at a selected engaged length.

10. The system of claim 9 and further comprising:

a reinforcement member positioned about an outer surface of the flexible annular wall and configured to reduce outward flexibility of at least a portion of the flexible annular wall.

11. The system of claim 10, wherein the reinforcement member comprises an annular tube positioned adjacent to an outer surface of the flexible annular wall.

12. The system of claim 9, wherein the plurality of corrugate sections are integral and comprise a single monolithic piece.

13. The system of claim 9, wherein the connection device is configured to compress the flexible annular wall along the centerline.

14. A method for providing a seal in a gas turbine engine system, the method comprising:

establishing a connection between a first end of a flexible annular seal and a gas turbine engine;

establishing a connection between a second end of the flexible annular seal and an exhaust nozzle;

defining exactly two corrugations in the flexible annular seal;

positioning a reinforcement member about an outer surface of the flexible annular seal at a location between the two corrugations;

providing a first bracket located at or near the first end of the of the flexible annular seal and a second bracket located at or near the second end of the flexible annular seal, wherein at least one of the first and second brackets includes a first portion and a second portion extending from the first portion at an angle greater than zero and less than 90° in a direction away from the flexible annular seal;

operatively connecting a compressive tool between the first and second brackets located at or near the first and second ends of the flexible annular seal to control an effective length of the flexible annular seal along a centerline defined by the flexible annular seal; and adjusting a mechanism to maintain the compressive tool at a selected engaged length.

15. The system of claim 9, wherein the plurality of corrugate sections define exactly two corrugate sections.

* * * * *